United States Patent [19]
Belloc et al.

[11] 3,906,113
[45] Sept. 16, 1975

[54] NEW AMYLASE AND ITS PREPARATION BY FERMENTATION OF A PENICILLIUM

[75] Inventors: Andre Belloc, Vanves; Jean Florent, Paris; Denise Mancy, Charenton; Jean Verrier, Boulogne-sur-Seine, all of France

[73] Assignee: Rhone-Poulenc S.A., Paris, France

[22] Filed: Feb. 20, 1973

[21] Appl. No.: 333,489

[30] Foreign Application Priority Data
Feb. 23, 1972 France .............................. 72.06107

[52] U.S. Cl. ...................... 426/64; 426/20; 195/62; 195/66 R
[51] Int. Cl.² ...................... C12d 13/10; A21d 8/04
[58] Field of Search ......... 195/65, 62, 66 R; 426/64

[56] References Cited
UNITED STATES PATENTS

| | | | |
|---|---|---|---|
| 3,288,683 | 11/1966 | Tanaka et al. ..................... | 195/66 R |
| 3,293,142 | 12/1966 | Yamada et al. ....................... | 195/62 |
| 3,512,992 | 5/1970 | Cooke et al. .......................... | 426/20 |
| 3,674,644 | 7/1972 | Yokotsuka et al. .................... | 195/62 |
| 3,697,378 | 10/1972 | Smalley ......................... | 195/66 R X |

*Primary Examiner*—Lionel M. Shapiro
*Attorney, Agent, or Firm*—Stevens, Davis, Miller & Mosher

[57] ABSTRACT

The enzyme preparation 27591 RP useful in the manufacture of baked goods made with flour is made by the culture of *Penicillium expansum* strain F 1046, (NRRL 5437).

10 Claims, No Drawings

NEW AMYLASE AND ITS PREPARATION BY FERMENTATION OF A PENICILLIUM

The present invention relates to an enzymatic preparation containing a new amylase, a process for its preparation and compositions containing it.

The new enzyme, hereinafter referred to as 27,591 R.P., can be obtained by culture, in artificial media, of "*Penicillium expansum*, Strain F 1,046" (NRRL 5437). A sample of this strain can be obtained from the Fermentation Laboratory, U.S. Department of Agriculture, Peoria, Illinois (U.S.A.).

27,591 R.P. is a protein which is isolated as a brown amorphous powder. It is soluble in water (about 5%), sparingly soluble in concentrated aqueous solutions of neutral salts such as ammonium sulphate, of alcohols and of ketones which are miscible with water, and insoluble in anhydrous alcohols and in anhydrous ketones. Its ultra-violet spectrum shows a shoulder at about 275-280 nanometres. When stored at +4°C in the absence of moisture, it still possesses 80% of its original activity after 6 months.

The activity of the enzyme 27,591 R.P. is exerted on a certain number of polysaccharides, such as starch, glycogen, and limit dextrins (residues obtained by treating starch with β-amylases). Its action is thus at least partially of the α-amylase type.

The activity of starch is determined in accordance with a technique based on the determination of α- and β-amylases by BERNFELD in "Methods in Enzymology" by Colowick S.P. and Kaplan N.O., Acad. Press., New York (1955) volume I - p. 149. The reducing sugars liberated during the hydrolysis are determined by colorimetry by reaction with 3,5-dinitrosalicyclic acid and are expressed in micro-equivalents of maltose. The enzymatic activity can be expressed in international units (I.U.): 1 such unit is the amount of enzyme which liberates 1 micro-equivalent of maltose per minute at 25°C at a definite pH, at pH 4 in the present case.

Tables I and II below give the results obtained for the hydrolysis of starch by the enzyme 27,591 R.P. at different pH's, at different temperatures and in different media. For each experiment, 150 μg of enzyme, of strength 2,660 I.U./g, were used.

The enzyme 27,591 R.P. is especially active in a slightly acid medium; the optimum pH is 4.0. The region of activity is very asymmetric relative to this value: the activity decreases rapidly below 4.0 (40% of the maximum activity at pH = 3.5; 7% at 3.0) or above 7.0 (50% at 70, 0 at 7.5). At pH = 4.0, the optimum temperature is about 55°C; at 65°C the enzyme still exerts about 50% of its maximum activity.

The new enzyme can be used advantageously in the foodstuff industries, particularly as an adjuvant in bread-making or for preparing fermented liquors such as beer or for desizing textiles.

TABLE I

HYDROLYSIS OF STARCH AT 25°C BY 27,591 R.P. AS A FUNCTION OF THE pH

| pH of the reaction medium | Nature of the buffer | Reducing sugars liberated per minute (μ-equivalents of maltose) |
|---|---|---|
| 3.0 | Acetate-0.2,M(A) | 0.029 |
| 3.5 | " | 0.115 |
| 4.0 | " | 0.400 |
| 4.5 | " | 0.379 |
| 5.0 | " | 0.350 |
| 5.5 | Phosphate-0.02M (P) | 0.264 |
| 6.0 | " | 0.260 |
| 6.5 | " | 0.250 |
| 7.0 | " | 0.208 |
| 7.5 | " | 0.000 |
| 8.0 | " | — |
| 8.5 | Borate-0.05 M(B) | — |
| 9.0 | " | — |

(A) = mixtures of 0.2 M acetic acid and 0.2 M sodium acetate.
(P) = mixtures of 0.02 M $KH_2PO_4$ and 0.02 M $Na_2HPO_4$.
(B) = mixtures of 0.2 M $H_3BO_3$ and 0.05 M $Na_2B_4O_7 \cdot 10H_2O$.

A = mixtures of 0.2 M acetic acid and 0.2 M sodium acetate.
P = mixtures of 0.02 M $KH_2PO_4$ and 0.02 M $Na_2HPO_4$.
B = mixtures of 0.2 M $H_3BO_3$ and 0.05 M $Na_2B_4O_7 \cdot 10H_2O$.

TABLE II

HYDROLYSIS OF STARCH BY 27,591 R.P. AT pH 4.0 (0.2 M ACETATE BUFFER) AS A FUNCTION OF THE TEMPERATURE

| Temperature °C | Reducing sugars liberated per minute (μ-equivalents of maltose) |
|---|---|
| 25 | 0.404 |
| 30 | 0.373 |
| 35 | 0.453 |
| 40 | 0.530 |
| 45 | 0.558 |
| 50 | 0.623 |
| 54 | 0.676 |
| 60 | 0.563 |
| 65 | 0.325 |
| 70 | 0.033 |
| 75 | 0.024 |

The organism which produces 27,591 R.P. is a strain of filamentous fungus which is denoted by the name *Penicillium expansum*, strain F 1046 (NRRL 5437). This strain has been isolated from a sample of earth taken from Cambodia near Phnom-Bakheng.

The method of isolation is as follows: the sample of earth is suspended in sterile distilled water, and then the suspension is diluted to different concentrations; a small volume of each dilution is spread over the surface of Petri dishes containing a nutrient agar medium. After incubation for several days at 25°C, the colonies of micro-organisms which it is desired to isolate are transplanted on agar slopes for the purpose of producing abundant cultures.

The morphological characteristics of *Penicillium expansum*, strain F 1046 were determined in accordance with the methods of identification described by F. E. CLEMENTS and C. L. SHEAR, "The Genera of Fungi", Hafner Publishing Co., New York (1954) and by R. B. RAPER and C. THOM, "A Manual of the Penicillia", The Williams and Wilkins Co., Baltimore (1949) as well as by the following authors: J. C. GILMAN, "A manual of Soil Fungi", Iowa State University Press (1957), G. L. BARRON, "The Genera of Hyphomycetes from Soil", The Williams and Wilkins Co., Baltimore (1968) and H. L. BARNETT, "Illustrated Genera of Imperfect Fungi", 2nd Edition, Burgess Publishing Co., Minneapolis (1960).

The morphological characteristics of the strain F1046 show that it belongs to the species *Penicillium expansum*.

Morphological characteristics of the strain which produces 27,591 R.P.

The morphological characteristics observed are those of isolated colonies produced by cultivating the strain in Petri dishes on four media frequently mentioned by K.B. RAPER and C. THOM, "A Manual of the Penicillia", The Williams and Wilkins Co., Baltimore (1949).

1. Czapek agar medium

Colonies of diameter 3 to 4 cm after 10 days of incubation at 25°C, of circular shape and of uneven thickness. Surface consisting of numerous conidiophores grouped in fascicles or in little bundles, the majority of which are connected to form concentric zones between which the presence of numerous simple conidiophores can be noted, thus forming an alternation between heavily and very markedly fasciculated zones and almost velvety parts.

The 2 to 3 mm marginal zone, which is white at the beginning of growth, rapidly becomes pale yellow to pale green with formation of numerous white fascicles terminated by green conidial masses. Moderate exudation of fine colourless to light yellow droplets in the conidial mass near the marginal part. Very marked mouldy smell. Underside of the colonies: light brownish yellow.

The vegetative mycelium, which is quite abundant, is formed from septate branched filaments from which uniformly septate conidiophores, carrying the conidial structures, stick out. Long conidiophores of 400 to 600 $\mu$ and sometimes greater than 700$\mu$ with an average diameter of 3.5$\mu$, with smooth or finely wrinkled walls, gathered together in fascicles or isolated, terminated by large penicilli of 40 to 80$\mu$ carrying intertwining chains or in columns of conidia of 150 to 250$\mu$. Penicilli typically asymmetric, most frequently branched once or twice, with branches of 15 to 30$\mu$ by 3 to 4 $\mu$ often located against the main axis.

Metulae generally in verticils of 2 to 5, measuring 13 to 17 $\mu$ by 3 to 4$\mu$.

Sterigmata in groups of 4 to 6, of 9 to 15$\mu$ by 2.5 to 3 $\mu$.

Conidia which are relatively ellipsoidal at the time of their formation but which become subspherical at maturity, of diameter 3 to 4 $\mu$, with smooth walls, forming pale yellow-green to pale green conidial masses.

2. Czapek agar medium containing corn-steep

The colonies develop more rapidly than on the preceding Czapek medium and reach a diameter of 5 to 6 cm after 10 days of incubation at 25°C.

Circular colonies of thickness which varies with the period of incubation, generally possessing about 15 radial grooves of medium depth and a heavily fasciculated marginal zone which is higher than the very finely granular to almost velvety central part formed from conidiophores which are often isolated. These colonies, which are light yellow-brown to pale yellow-green at the start of the incubation, become almost uniformly pale green after two weeks, with a light brownish zone persisting. Exudation of fine golden yellow droplets near the marginal zone which disappear after two weeks.

Very marked mouldy smell.

Underside light yellow-brown

Asymmetric penicilli of composition and dimensions similar to those already described for the first medium.

3. Agar medium containing malt extract

Colonies of diameter 4.5 to 5 cm after 10 days of incubation at 25°C, of almost circular shape, flat and relatively thin. Surface with a granular appearance in the marginal zone to an almost velvety appearance at the centre. Well sporulated colonies; marginal zones formed from little bundles of conidial apparatus. Pale green colonies with greyish white edges, becoming uniformly green after 8 to 10 days of incubation.

Mouldy smell

Underside very light greenish yellow

Asymmetric penicilli of composition and dimensions comparable to those already described above, but the chains of conidia are longer and very often exceed 300 $\mu$.

4. Agar medium containing maize flour

Colonies of diameter 4.5 cm after 10 days of incubation at 25°C, of circular shape, flat and relatively thin. Surface with a finely granular appearance in the marginal zone to an almost velvety appearance in the centre. Presence of 4 to 5 zones of fine granulations in the marginal part. Pale green, well sporulated colonies with a white marginal part, becoming uniformly green after 10 days of incubation.

Exudation of fine colourless droplets near the marginal zone which disappear after 8 to 10 days of incubation.

Marked mouldy smell

Underside brownish

Asymmetric penicilli of composition and dimensions similar to those already described for the first medium.

Furthermore, the strain was deeply inoculated into apples and lemons:

Apples are attacked much more rapidly than lemons; regions of brown rot, 3 to 4 cm in diameter, appear at the surface of the apple and extend inside it, after 8 days of incubation; after 10 to 15 days of incubation, the strain develops at the surface of the fruit in the form of pale green bundles and conidial masses with a few well defined coremiform structures, of height 1 to 2 mm.

Determination of the species of the strain which produces 27,591 R.P.

By referring to the identification key of "The Genera of Fungi" and to the definition of the Penicillium genus in "A manual of the Penicillia", the strain which produces 27,591 R.P. can be classified as belonging to the *Penicillium genus*.

In effect, the mycelium is formed from well-separated septate hyphal filaments. The fertile hyphae or conidiophores stick out from the vegetative mycelium as branches of the latter. The conidiophores, which are not swollen, are uniformly septate. The conidial apparatus, in the form of a small unevenly verticillate brush, is composed of several "metulae" carrying groups of sterigmata. This conidial apparatus is often branched below the level of the "metulae", with one or two branches. The sterigmata carry single, unbranched chains of subspherical conidia. The liberation and the dispersion of these conidia make it possible to propagate the strain.

The use of the identification key of K.B. RAPER and C. THOM makes it possible to determine, successively, the Section, the Sub-Section, the Series and the Species to which the strain which produces 27,591 R.P. belongs.

The presence of "penicilli" which are generally asymmetric and possess one or two branches below the level of the sterigmata, indicates that the strain should be classified in the *Asymmetrica Section*.

The presence of "penicilli" which are usually compact and the fasciculated or coremiform appearance of the surface of the colonies indicates that the strain should be classified in the *Fasciculata sub-section*.

The fasciculated appearance, with numerous simple conidiophores, of the surface of the colonies the absence of sclerotia, the pale green to pale yellow-green colouration of the colonies and the property of rapidly forming zones of brown rot in apples indicate that the strain should be classified in the *Penicillium expansum series*.

This series comprises two main species, namely *Penicillium expansum* and *Penicillium crustosum*.

Comparison of the main characteristics of the strain which produces 27,591 R.P. with those of the species *Penicillium expansum* described in "A manual of the Penicillia" shows that, as regards the morphological characteristics investigated, no significant differences exist between the strain which produces 27,591 R.P. and the species *Penicillium expansum*.

The process for the preparation of 27,591 R.P. consists essentially of culturing *Penicillium expansum*, strain F 1046, on a suitable medium under suitable conditions and of isolating the product formed during the culture.

The culture of *Penicillium expansum*, strain F 1046, can be carried out by any of the usual methods of aerobic surface culture or submerged culture, but the latter is preferred for reasons of convenience. For this purpose, the inoculation and fermentation techniques and the different types of apparatus which are usually employed in the fermentation industry can be used.

The fermentation medium must, essentially contain assimilable sources of carbon and nitrogen, inorganic materials and, optionally, growth factors; all these ingredients can be supplied as well-defined products or as complex mixtures, such as are encountered in various biological products.

Typical sources of assimilable carbon, include carbohydrates such as glucose, maltose, dextrins, starch and other carbohydrate substances such as sugar alcohols like glycerol and mannitol as well as certain organic acids like malic acid and citric acid. Animal or vegetable oils such as bacon fat or soya bean oil can advantageously replace part or all of these various carbohydrate sources.

Suitable sources of assimilable nitrogen are extremely varied. They can be simple chemical substances such as inorganic or organic ammonium salts, urea and certain aminoacids. Assimilable nitrogen can also be introduced as complex substances, containing nitrogen principally as protein, such as casein, lactalbumin, gluten and their hydrolysis products, soya flour, groundnut flour, fishmeal, peptone, meat extract, yeast extract, distillers' solubles and corn-steep.

Suitable sources of inorganic materials include those having a buffering or neutralising effect such as the alkali metal and alkaline earth phosphates, or calcium and magnesium carbonates. Others provide the ionic equilibrium necessary for the development of *Penicillium expansum*, strain F 1046, such as alkali metal and alkaline earth metal chlorides and sulphates as well as some zinc, cobalt, iron, copper and manganese salts.

The pH of the fermentation medium at the start of the culture should be between 6.0 and 8.5 and preferably between 6.5 and 8. The optimum temperature for the fermentation is 24° – 28°C, but a satisfactory rate of growth can be achieved at temperatures generally between 20° and 35°C. The aeration of the fermentation can vary between rather wide values. It has, however, been found that 0.3 to 3 litres of air per litre of broth per minute are especially suitable. The maximum yield is obtained after approximately 7 days of culture, this period depending primarily on the medium used.

27,591 R.P. can be isolated from the fermentation musts in the following manner. It is possible to filter the fermentation must at a pH of between 6.5 and 7.5 and preferably at pH about 7, then to concentrate the filtrate thus obtained to a volume of approximately one-eighth of the original volume, to dialyse it through a membrane against water in order to remove low molecular weight substances and then to precipitate 27,591 R.P. by adding a poor solvent for it such as methanol or isopropanol.

The crude enzyme can be purified advantageously by one or more of the following methods:
  Fractional precipitation using concentrated aqueous solutions of inorganic salts such as ammonium sulphate and/or using poor solvents for 27,591 R.P. such as methanol or isopropanol;
  chromatography of an aqueous solution 27,591 R.P. on various adsorbents; silica, dextrane or polyacrylamide gels are preferably used;
  or dialysis through a membrane, preferably a regenerated cellulose membrane, against water.

The following Examples further illustrate the present invention. The activity of the products is expressed in international units (I.U.) defined above; this is expressed in I.U./cm$^3$ when the product is in solution and in I.U./g when the product is solid.

EXAMPLE 1

The following are introduced into a 170 litre fermenter

| | |
|---|---|
| Corn steep (50% of dry material) | 4,800 g. |
| Glucose monohydrate | 2,400 g. |
| Calcium carbonate | 600 g. |
| Sodium chloride | 600 g. |
| Magnesium sulphate heptahydrate | 120 g. |
| Tap water, to make up to 110 litres. | |

The pH is adjusted to 7.6 by adding 10 N sodium hydroxide solution (580 cc). The medium is sterilized by bubbling steam at 122°C through it for 40 minutes. After cooling, the volume of the broth is 120 litres (the increase is due to condensation of steam during the sterilisation); the pH is 6.75. It is inoculated with a culture (200 cc) of *Penicillium expansum*, strain F 1046, produced in a shaken Erlenmeyer flask. The culture is developed at 27°C for 30 hours, whilst shaking and aerating with sterile air; it is then suitable for inoculating the production culture.

The production culture is carried out in a 350 litre fermenter into which the following substances are introduced:

| | |
|---|---|
| Corn steep (50% of dry material) | 8,000 g. |
| Glucose monohydrate | 4,000 g. |
| Calcium carbonate | 1,000 g. |
| Sodium chloride | 1,000 g. |
| Magnesium sulphate heptahydrate | 200 g. |
| Tap water, to make up to 170 litres. | |

The pH is adjusted to 7.6 by adding 10 N sodium hydroxide solution (950 cc) and then the medium is sterilised at 122°C for 40 minutes. After cooling, the volume of the broth is 200 litres; the pH is 6.80.

It is inoculated with the inoculum culture (20 litres) from the 170 litre fermenter described above; the culture is developed at 27°C for 20 hours, whilst stirring with a turbine revolving at 205 revolutions/minute and whilst aerating with 10 m³/hour of sterile air. From the 20th hour and over the next 20 hours, a 40% solution of glucose hydrate (10 litres) is added under sterile conditions at the rate of 500 cc./hour, whilst maintaining the same aerating and stirring conditions. After the addition of all the glucose, the pH of the culture is 5.30. The total duration of the culture since inoculation is 7 days. At the end of the culture, the pH is 8.30 and the amylase activity (at pH 4) is 2 I.U./cc.

A must (8,000 cc.) prepared under the above conditions is adjusted to pH 7 by adding 5 N hydrochloric acid, "Supercel" (diatomaceous earth; 800 g) is added to it and the whole is filtered through a fluted filter. A filtrate (8,000 cc.), of strength 2.5 I.U./cc., is obtained. The filtrate obtained is concentrated under reduced pressure (2 mm Hg) at 25°C until it is one eighth of its original volume. A concentrate (1,050 cc.) of strength 17.7 I.U./cc., is obtained.

The concentrate is dialysed for 17 hours against distilled water (10 volumes) at +4°C and then it is clarified by filtration (centrifuging is also suitable). A clear concentrate (1,440 cc.) of strength 12.6 I.U./cc., is obtained.

The clarified concentrate is cooled to +4°C; methanol (4,500 cc.) which has previously been cooled to −20°C is then added with stirring and stirring is then continued for a further 2 minutes. The precipitate is collected by centrifuging at +4°C and 2,000 G for 5 minutes.

The precipitate is stirred for 15 minutes in distilled water (1,000 cc.) which has been cooled to +4°C. The solution is clarified by centrifuging at 2,000 G and +4°C for 5 minutes. A solution (1,050 cc.), of strength 7.7 I.U./cc., is obtained.

Crystalline ammonium sulphate (496 g.) is added to the clarified solution which is still kept at +4°C and the whole is stirred for 20 minutes to dissolve the salt. The solution is left to stand for 3 hours and is then centrifuged at 2,000 G for 10 minutes at +4°C.

The precipitate is dissolved in distilled water (250 cc.) at +4°C and the solution is dialysed overnight against distilled water (2,500 cc.). A dialysate (300 cc.), of strength 37 I.U./cc., is obtained.

Isopropanol (450 cc.), which has previously been cooled to −20°C is poured into the dialysate which is kept at +4°C and stirred, and then stirring is continued for a further 5 minutes. The enzyme is collected by centrifuging at 0°C for 10 minutes at 12,000 G. After drying the product obtained, under reduced pressure and at a temperature of about 20°C, the enzyme 27,591 R.P. (1.7 g.), of strength 2,900 I.U./g., is obtained.

The enzyme 27,591 R.P. can be employed, depending on the intended use, in the form of compositions in which it can be dispersed at various concentrations, as a mixture with other compatible products which are either inert and thus act as diluents or which themselves possess a definite use, for example, dispersing agents, flavouring substances, dyestuffs or denaturing agents.

A highly concentrated composition, for industrial use in the textile industry, can, for example, contain:

| | |
|---|---|
| Enzyme 27,591 R.P. of strength 2,900 I.U./g. | 99% by weight (approximately 2,900 I.U./g.) |
| Pyrogenic silica | 0.9 % by weight |
| Denaturing dyestuff | 0.1 % by weight |

A less concentrated composition, for bread-making, can, for example, contain:

| | |
|---|---|
| Enzyme 27,591 R.P. of strength 2,900 I.U./g. | 1% by weight (approximately 30 I.U./g.) |
| Wheat flour or starch | 99 % by weight |

These compositions can be diluted at the time of use, at the choice of the user depending on the desired results.

The compositions according to the invention usually contain an amount of enzyme representing 2,900 to $2 \times 10^{-4}$ I.U. per gram.

EXAMPLE 2

This Example illustrates the action of the amylase 27,591 R.P. on aqueous suspensions of flour.

Suspensions of flour are prepared in accordance with the following formulation:

| | |
|---|---|
| Wheat flour (14 % moisture content) | 80 g. |
| Enzyme 27,591 R.P. of strength 2,600 I.U./g. | x mg. |
| Water | 450 cc. |
| x having one of the following values: 0, 8, 80 or 800. | |

The gelling of the suspensions thus produced is investigated, as a function of the time and the temperature, using a BRABENDER amylograph, a torsion viscometer which can record variations in viscosity of a paste. The temperature is initially 25°C and it increases uniformly by 1.5°C per minute. The amylogram makes it possible to determine: the temperature at which gelling starts, corresponding to an increase in viscosity of 20 BRABENDER units ("B.U.") (arbitrary units defined by the designer of the apparatus), the maximum gelling temperature and the maximum viscosity.

The Table gives the values obtained for these 3 variables as a function of the concentration of the enzyme.

| Concentration of the enzyme 27,591 R.P. relative to the flour | | Temperature | | Maximum viscosity |
|---|---|---|---|---|
| g/kg. | I.U./g. | at the start of gelling | at maximum gelling | B.U. |
| 0 |  | 62°C | 86°C | 590 |
| 0.1 | 0.26 | 62°C | 87°C | 490 |
| 1 | 2.6 | 62°C | 88°C | 280 |
| 10 | 26 |  |  | 80 |

It can thus be seen that the amylase added decreases the viscosity of the suspensions; the amylase can thus be used in bread-making or in biscuit-making when hypoamylase flours are used.

We claim:

1. The enzyme 27591 RP, which is:
   a. a protein;
   b. soluble in water, sparingly soluble in concentrated aqueous solutions of neutral salts and of alcohols and ketones which are miscible with water and insoluble in such anhydrous alcohols and ketones;
   c. it retains 80% of its original activity after 6 months at 4°C., in the absence of moisture;
   d. it exerts $\alpha$-amylase activity on starch, glycogen and limit dextrins;
   e. its optimum activity on starch is at about pH 4 at 55°C; at 25°C., its activity decreases rapidly below pH 4.0 and above pH 7.0; at pH 4 and 65°C., its activity represents about 50% of the optimum activity; and
   f. it is extracted from artificial culture media of the strain denoted *Penicillium expansum* F 1046 (NRRL 5437).

2. The enzyme according to claim 1 which has an activity of substantially 2,900 I.U./g.

3. Process for the production of the enzyme 27591 RP which comprises culturing aerobically *Penicillium expansum* (NRRL 5437) on a nutrient medium and isolating the enzyme produced.

4. Process according to claim 3 in which the culture is carried out at a pH between 6.5 and 8 at a temperature of 24° to 28°C.

5. Process according to claim 3 in which the culture medium is aerated with 0.3 to 3 litres of air per minute per litre of medium.

6. Process according to claim 3 in which the culture is continued for about 7 days.

7. An amylolytic composition which comprises enzyme 27591 RP as defined in claim 1 and a compatible diluent, the said composition containing 0.01 to 99% by weight of the said enzyme and having an activity of at least $2 \times 10^{-4}$ I.U./g.

8. A composition according to claim 7 in which the diluent is a dispersing agent, flavouring substance, dyestuff or denaturing agent.

9. A composition according to claim 7 which contains from 1 to 99% by weight of the enzyme.

10. A composition according to claim 7 in which the diluent is wheat flour or starch.

* * * * *